United States Patent
Vo et al.

(10) Patent No.: US 10,053,998 B2
(45) Date of Patent: Aug. 21, 2018

(54) MULTI-PURPOSE GAS TURBINE SEAL SUPPORT AND ASSEMBLY

(71) Applicant: United Technologies Corporation, Hartford, CT (US)

(72) Inventors: Tuan David Vo, Middletown, CT (US); Conway Chuong, Manchester, CT (US); Matthew Budnick, Hudson, NH (US); Jonathan Ariel Scott, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 272 days.

(21) Appl. No.: 14/653,243

(22) PCT Filed: Dec. 23, 2013

(86) PCT No.: PCT/US2013/077397
§ 371 (c)(1),
(2) Date: Jun. 17, 2015

(87) PCT Pub. No.: WO2014/105780
PCT Pub. Date: Jul. 3, 2014

(65) Prior Publication Data
US 2015/0330244 A1    Nov. 19, 2015

Related U.S. Application Data

(60) Provisional application No. 61/747,270, filed on Dec. 29, 2012.

(51) Int. Cl.
*F01D 11/02* (2006.01)
*F01D 11/12* (2006.01)
(Continued)

(52) U.S. Cl.
CPC .............. *F01D 11/02* (2013.01); *F01D 9/065* (2013.01); *F01D 11/001* (2013.01);
(Continued)

(58) Field of Classification Search
CPC ........ F01D 11/02; F01D 9/065; F01D 11/001; F01D 11/003; F01D 11/122
(Continued)

(56) References Cited

U.S. PATENT DOCUMENTS

| 2,214,108 A | 7/1938 | Grece |
| 3,576,328 A | 4/1971 | Vose |

(Continued)

FOREIGN PATENT DOCUMENTS

| WO | WO 03/020469 A1 | 3/2003 |
| WO | WO 2006/007686 A1 | 1/2006 |

(Continued)

OTHER PUBLICATIONS

Extended European Search Report for European Application No. 13867264.7, dated Jan. 15, 2016, 8 pages.

(Continued)

*Primary Examiner* — Marina Tietjen
*Assistant Examiner* — Paul J Gray
(74) *Attorney, Agent, or Firm* — Kinney & Lange, P.A.

(57) ABSTRACT

A gas turbine engine assembly includes a first module, a second module rotatable about a center line of the gas turbine engine and fluidly coupled with the first module, and a multi-purpose seal support. The multi-purpose seal support includes an aft end secured to the first module, and a forward end disposed proximate the second module. The forward end has a discourager portion, a seal portion, and a meshing portion.

19 Claims, 7 Drawing Sheets

(51) Int. Cl.
*F01D 25/28* (2006.01)
*F02C 7/28* (2006.01)
*F01D 9/06* (2006.01)
*F01D 11/00* (2006.01)
*F01D 25/16* (2006.01)

(52) U.S. Cl.
CPC .......... *F01D 11/122* (2013.01); *F01D 25/162* (2013.01); *F01D 25/28* (2013.01); *F02C 7/28* (2013.01)

(58) Field of Classification Search
USPC .......................................... 415/173.7, 173.5
See application file for complete search history.

(56) References Cited

U.S. PATENT DOCUMENTS

| | | |
|---|---|---|
| 3,802,046 A | 4/1974 | Wachtell et al. |
| 3,970,319 A | 7/1976 | Carroll et al. |
| 4,009,569 A | 3/1977 | Kozlin |
| 4,044,555 A | 4/1977 | McLoughlin et al. |
| 4,088,422 A | 5/1978 | Martin |
| 4,114,248 A | 9/1978 | Smith et al. |
| 4,305,697 A | 12/1981 | Cohen et al. |
| 4,321,007 A | 3/1982 | Dennison et al. |
| 4,369,016 A | 1/1983 | Dennison |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,793,770 A | 12/1988 | Schonewald et al. |
| 4,883,405 A | 11/1989 | Walker |
| 4,920,742 A | 5/1990 | Nash et al. |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | VonBenken et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,224,822 A | 7/1993 | Lenahan et al. |
| 5,236,302 A | 8/1993 | Weisgerber et al. |
| 5,246,295 A | 9/1993 | Ide |
| 5,265,807 A | 11/1993 | Steckbeck et al. |
| 5,269,057 A | 12/1993 | Mendham |
| 5,272,869 A | 12/1993 | Dawson et al. |
| 5,273,397 A | 12/1993 | Czachor et al. |
| 5,292,227 A | 3/1994 | Czachor et al. |
| 5,312,227 A | 5/1994 | Grateau et al. |
| 5,338,154 A | 8/1994 | Meade et al. |
| 5,357,744 A | 10/1994 | Czachor et al. |
| 5,370,402 A | 12/1994 | Gardner et al. |
| 5,385,409 A | 1/1995 | Ide |
| 5,401,036 A | 3/1995 | Basu |
| 5,438,756 A | 8/1995 | Halchak et al. |
| 5,474,305 A | 12/1995 | Flower |
| 5,483,792 A | 1/1996 | Czachor et al. |
| 5,558,341 A | 9/1996 | McNickle et al. |
| 5,597,286 A | 1/1997 | Dawson et al. |
| 5,605,438 A | 2/1997 | Burdgick et al. |
| 5,609,467 A | 3/1997 | Lenhart et al. |
| 5,632,493 A | 5/1997 | Gardner |
| 5,634,767 A | 6/1997 | Dawson |
| 5,691,279 A | 11/1997 | Tauber et al. |
| 5,755,445 A | 5/1998 | Arora |
| 5,851,105 A | 12/1998 | Fric et al. |
| 5,911,400 A | 6/1999 | Niethammer et al. |
| 6,062,813 A | 5/2000 | Halliwell et al. |
| 6,163,959 A | 12/2000 | Arraitz et al. |
| 6,196,550 B1 | 3/2001 | Arora et al. |
| 6,227,800 B1 | 5/2001 | Spring et al. |
| 6,337,751 B1 | 1/2002 | Kimizuka |
| 6,343,912 B1 | 2/2002 | Mangeiga et al. |
| 6,358,001 B1 | 3/2002 | Bosel et al. |
| 6,364,316 B1 | 4/2002 | Arora |
| 6,439,841 B1 | 8/2002 | Bosel |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,619,030 B1 | 9/2003 | Seda et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kasel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 | 6/2006 | Baxter et al. |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2004/0213666 A1 | 10/2004 | Gieg et al. |
| 2005/0046113 A1 | 3/2005 | Inoue |
| 2006/0010852 A1 | 1/2006 | Gekht et al. |
| 2007/0098545 A1* | 5/2007 | Alvanos ............... F01D 5/081 415/170.1 |
| 2008/0216300 A1 | 9/2008 | Anderson et al. |
| 2009/0142182 A1 | 6/2009 | Kapustka |
| 2009/0238683 A1* | 9/2009 | Alvanos ............... F01D 11/001 415/173.7 |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0202872 A1 | 8/2010 | Weidmann |
| 2010/0236244 A1 | 9/2010 | Longardner |

(56) References Cited

U.S. PATENT DOCUMENTS

| | | |
|---|---|---|
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0061767 A1 | 3/2011 | Vontell et al. |
| 2011/0081237 A1 | 4/2011 | Durocher et al. |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0017594 A1 | 1/2012 | Kowalskie et al. |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| WO | WO 2009/157817 A1 | 12/2009 |
| WO | WO 2010/002295 A1 | 1/2010 |
| WO | WO 2012/158070 A1 | 11/2012 |

OTHER PUBLICATIONS

International Search Report and Written Opinion, dated Apr. 14, 2014, for PCT Application No. PCT/US2013/077397, 14 pages.

\* cited by examiner

MULTI-PURPOSE GAS TURBINE SEAL SUPPORT AND ASSEMBLY

BACKGROUND

The described subject matter relates to gas turbine engines, and more particularly to seals within gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Seals are required in many locations within a gas turbine engine to regulate air flow to various portions of the engine. From time to time these seals may become damaged, fail or provide for inadequate sealing. This can result in the undesirable heating of engine components.

Flow management often requires a seal on one side of the module to prevent the hot air from the flow path entering and heating the steel frame. Furthermore, a seal land is also required nearby to provide sealing between a rotating disk and an adjacent cavity. A structural part is also useful to transfer meshing loads from the rotating disk to the frame in case of shaft failure. All these functional requirements normally would require multiple pieces of hardware with attendant complexity, leakage, and space considerations.

SUMMARY

A gas turbine engine assembly comprises a first module, a second module rotatable about a center line of the gas turbine engine and fluidly coupled with the first module, and a multi-purpose seal support. The multi-purpose seal support includes an aft end secured to the second module, and a forward end disposed proximate the first module. The forward end has a discourager portion, a seal portion, and a meshing portion.

A turbine exhaust case (TEC) assembly comprises a frame, a fairing, and a multi-purpose seal support. The fairing defines a main gas flow passage generally axially through the frame. The multi-purpose seal support includes an aft end secured to the inner hub. A forward end has a discourager, a seal, and a meshing recess.

A multi-purpose seal support element for a gas turbine engine comprises a ring-shaped body, a flow inhibitor portion, a seal, and a bridging portion. The body includes an axially forward end and an axially aft end. The flow inhibitor portion is formed at the forward end of the body. The seal includes at least one seal land formed proximate the flow inhibitor portion. The bridge portion is disposed proximate the seal and includes at least one U-shaped recess.

DETAILED DESCRIPTION

A multi-purpose seal support element for a turbine exhaust case (TEC) assembly or other gas turbine module can incorporate at least three features or functions which have not previously been combined in a single component. (1) A discourager is positioned adjacent a corresponding recess on the hot gas path wall or fairing to maintain a tortuous path for hot working/combustion ingestion into a cavity defined in part between the fairing and the multi-purpose seal support. (2) A seal portion engages or receives a corresponding seal portion of an adjacent module to prevent leakage of working or combustion gas into an inner cavity. (3) A fail safe meshing portion can be formed between seal lands or incorporated with one or more fishmouth seals to engage a rotor and bridge the upstream module with the TEC assembly in the event of failure. The axially extending portion of the support assembly transfers failure loads axially through the support ring into the TEC frame. A mounting end of the multi-purpose seal support can be fastened directly to the completed TEC assembly or other module. The combination simplifies assembly of the engine, reduces leakage, and improves maintainability.

Figure 1:
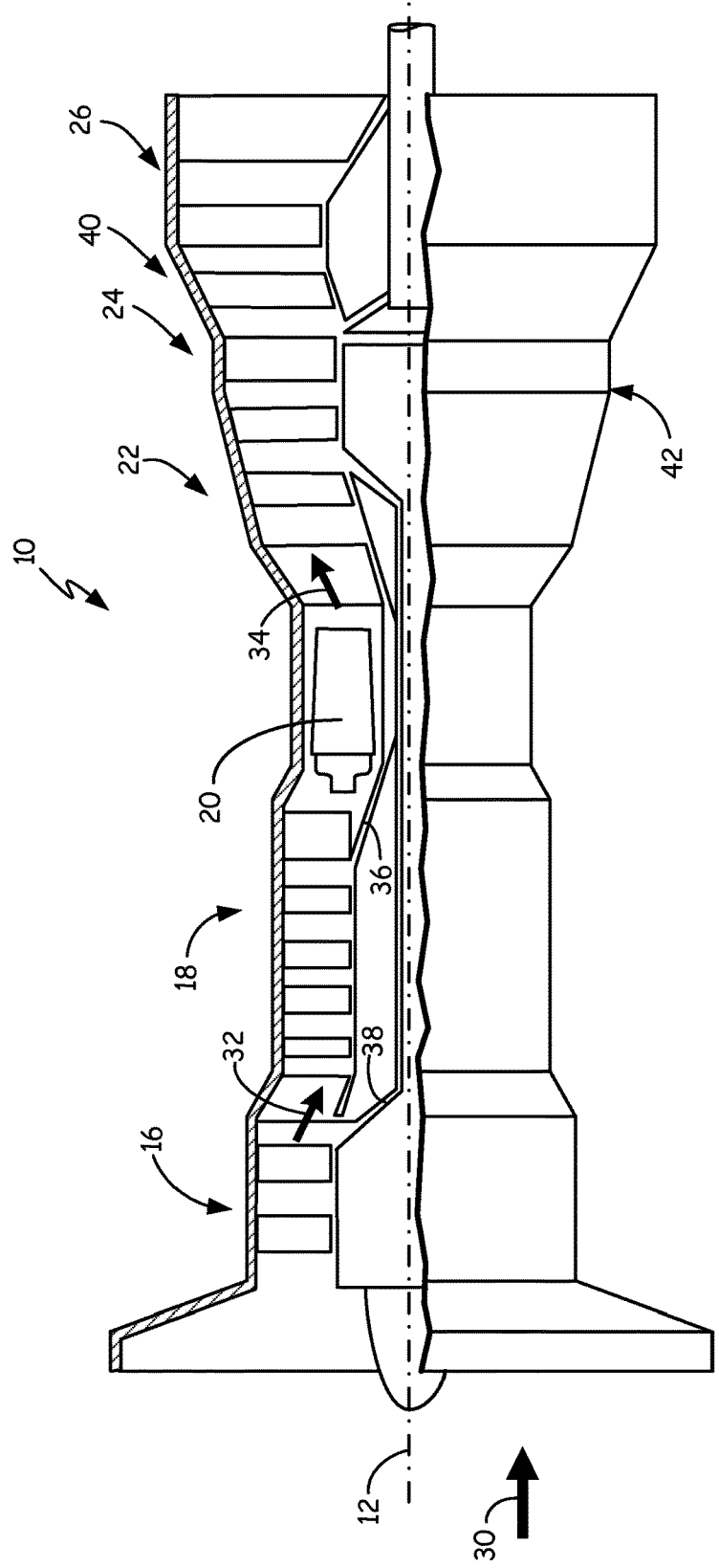
FIG. 1 schematically depicts an example gas turbine engine.

FIG. 1 shows industrial gas turbine engine 10, one example of a gas turbine engine. Engine 10 is circumferentially disposed about a central, longitudinal axis, or engine centerline axis 12, and includes in series order, low pressure compressor section 16, high pressure compressor section 18, combustor section 20, high pressure turbine section 22, and low pressure turbine section 24. In some examples, a free turbine section 26 is disposed aft of the low pressure turbine 24. Free turbine section 26 is often described as a "power turbine" and may rotationally drive one or more generators, centrifugal pumps, or other apparatus.

As is well known in the art of gas turbines, incoming ambient air 30 becomes pressurized air 32 in compressors 16, 18. Fuel mixes with pressurized air 32 in combustor section 20, where it is burned. Once burned, combustion gases 34 expand through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown). Turbine exhaust case (TEC) assembly 42 is also shown in FIG. 1, disposed axially between low pressure turbine section 24 and power turbine 26. TEC assembly 42 is described in more detail below.

FIG. 1 provides a basic understanding and overview of the various sections and the basic operation of an industrial gas turbine engine. Although illustrated with reference to an industrial gas turbine engine, the described subject matter also extends to aero engines having a fan with or without a fan speed reduction gearbox, as well as those engines with more or fewer sections than illustrated. It will become apparent to those skilled in the art that the present application is applicable to all types of gas turbine engines, including those in aerospace applications. In this example, the subject matter is described with respect to TEC assembly 42 between turbine sections 24, 26 configured in a sequential flow arrangement for an industrial gas turbine engine. However, it will be appreciated that the teachings can be readily adapted to other turbine applications with fluidly coupled modules, such as but not limited to a mid-turbine frame, an interstage turbine frame, and/or a turbine exhaust case for an aircraft engine. In other alternative embodiments, TEC assembly 42 can be adapted into a case assembly or module for portions of compressor sections 16 and/or 18.

Figure 2:
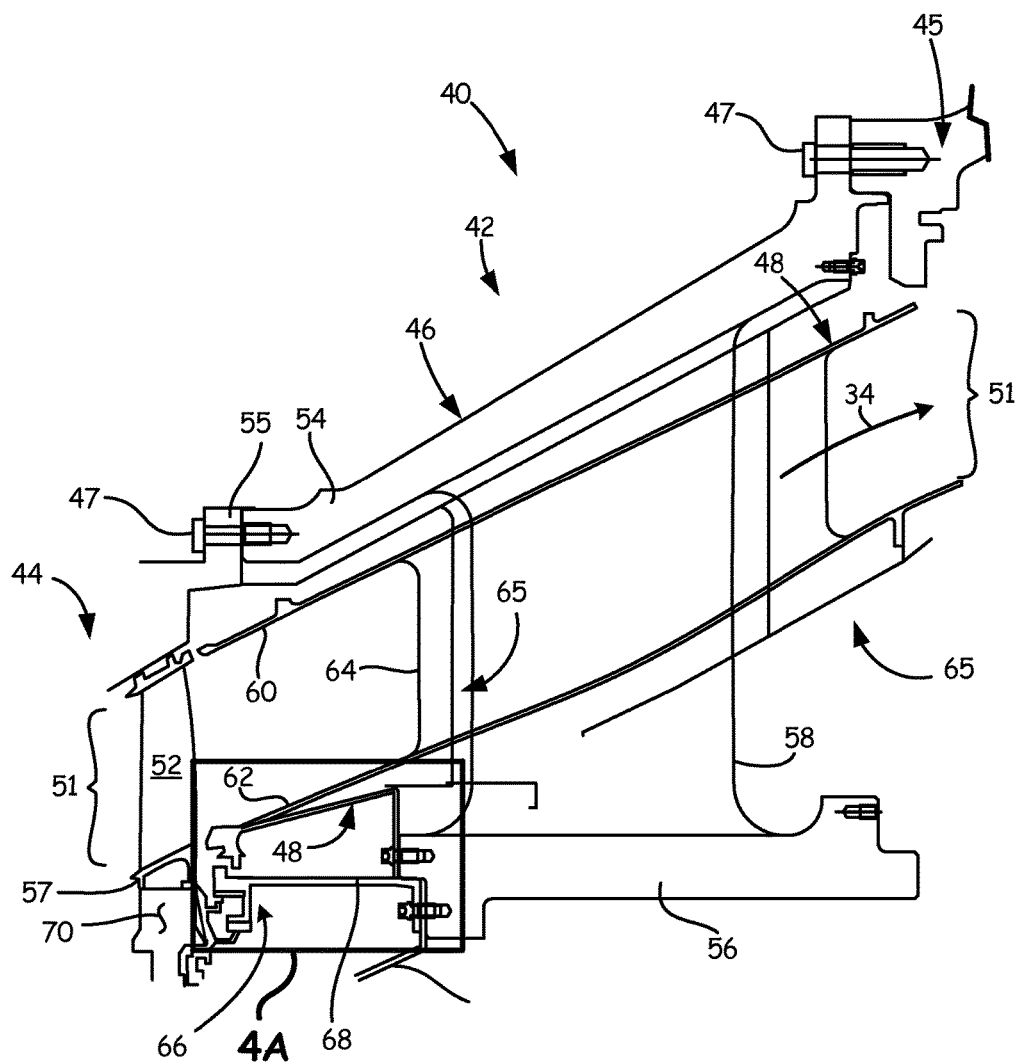
FIG. 2 is a detailed view of a turbine assembly portion of the engine shown in FIG. 1.

FIG. 2 shows engine assembly 40, and also includes TEC assembly 42, second module 44, and seal assembly 66 therebetween.

As described above, this illustrative example will be described with reference to turbine exhaust case (TEC) assembly 42 as a first turbine module, but the described subject matter can be readily adapted for several other gas turbine modules. TEC assembly 42 may be interconnected with a second upstream module 44 such as a low-pressure turbine module. TEC assembly 40 may also be connected to a downstream module 45 such as a power turbine module.

As seen in FIG. 2, TEC assembly 42 includes frame 46. Fairing assembly 48 extends generally axially through frame 46 to define main gas flow passage 51 for working/combustion gases 34 to flow during operation. The upstream module (e.g., low-pressure turbine 24 shown in FIG. 1) can include other components such as rotor blade 52 and/or an exit guide vane (not shown). These components are disposed upstream of frame 46 and fairing assembly 48 with respect to a conventional flow direction of working/combustion gases 34 through a conventional industrial gas turbine (IGT) system. The downstream module (e.g., power turbine 26 shown in FIG. 1) can include other components (not shown) such as a stator vane and rotor blade, which are disposed downstream of frame 46 and fairing assembly 48 with respect to the conventional flow direction of working/combustion gases 34.

Frame 46 includes outer case 54, inner hub 56, and a circumferentially distributed plurality of struts 58 (only one shown in FIG. 2) extending radially between outer case 54 and inner hub 56. Second module 44 is connected to first module (e.g., TEC assembly) 42 via fasteners 47 such that modules 42 and 44 abut along outer cases 54 and 55.

In this example, fairing assembly 48 includes outer fairing platform 60, inner fairing platform 62, and strut liners 64. In the embodiment shown, fairing assembly 48 is secured over annular surfaces of frame 46. In this example, fairing assembly 48 is adapted to have outer fairing platform 60 disposed radially inward of outer case 54 while inner fairing platform 62 may be disposed radially outward of inner frame hub 56. Strut liners 64 can also be adapted to be disposed around frame struts 58. Outer fairing platform 60 has a generally conical shape. Similarly, inner fairing platform 62 has a generally conical shape. Inner fairing platform 62 is spaced from outer platform 60 by strut liners 64. When assembled, outer fairing platform 60, inner fairing platform 62, and fairing strut liners 64 define a portion of main gas flow passage 51 for combustion gases 34 to pass through TEC assembly 42 during engine operation.

Main gas flow passage 51 can also be sealed between adjacent gas turbine modules, such as around the edges of fairing assembly 48, to prevent leakage and unwanted heating of frame 46 in TEC assembly 42. In one example, seal assembly 66 is secured to TEC assembly 42 and is adapted to perform multiple sealing and support functions at the interconnection between TEC assembly 42 and second module 44.

Similar to first module/TEC assembly 42, second module 44 includes various components such as rotor blade 52, outer radial case 55, blade platform 57, and rotor disk 70. Blade platform 57 is a rotating component which forms an inner radial edge of main engine gas flow passage 51. Seal assembly 66 is disposed generally radially inward from inner fairing platform 62, and axially between frame inner hub 56 and upstream rotor disk 70. Rotor disk 70 is disposed radially inward of main gas flow passage 51 and interfaces with adjacent portions of assembly 66 and multi-purpose seal support 68. As will be discussed subsequently, multi-purpose seal support 68 includes a discourager portion, a seal portion, and a meshing portion.

Figure 3:
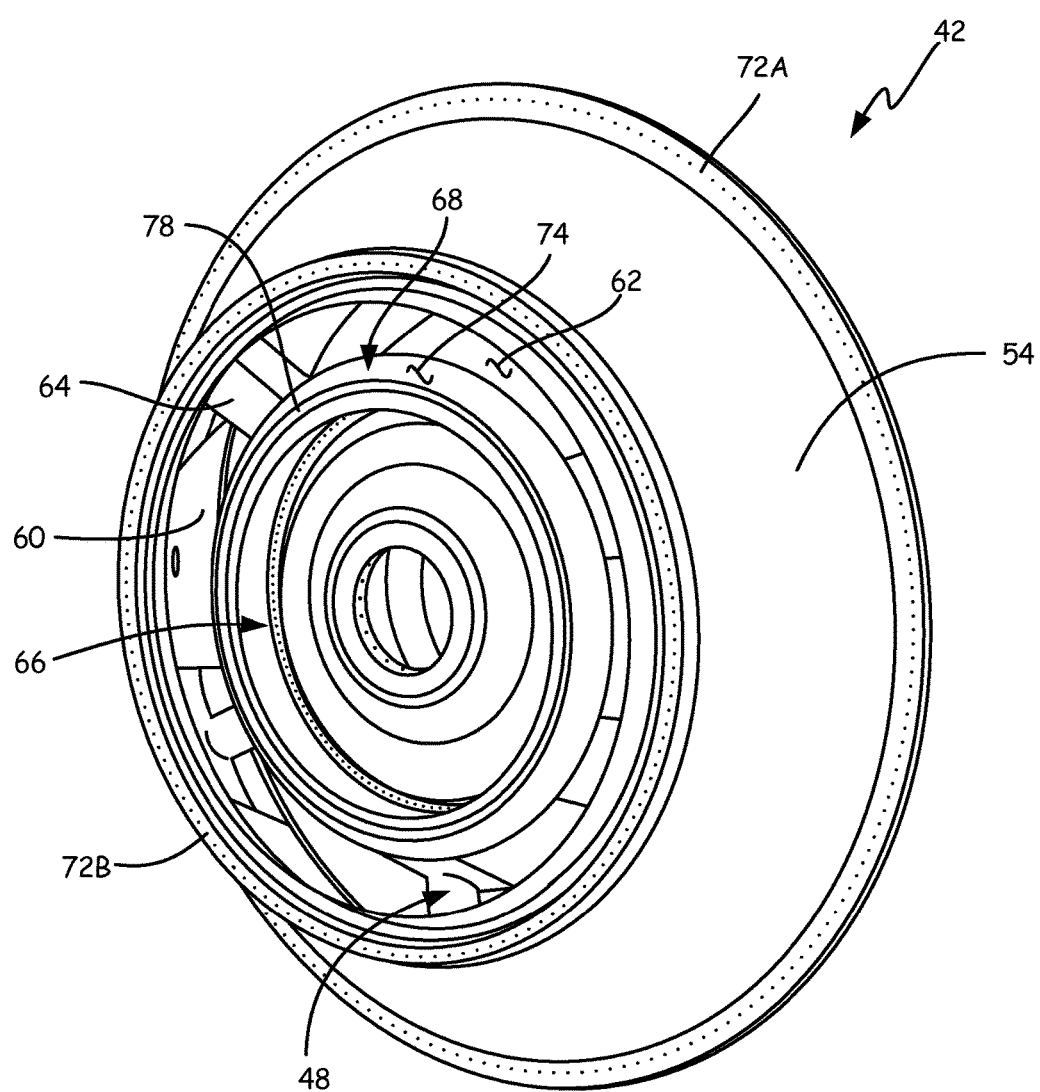
FIG. 3 isometrically shows a turbine exhaust case with a multi-purpose seal support.

FIG. 3 shows an isometric view of turbine exhaust case assembly 42 with multi-purpose seal support 68 secured thereto. TEC assembly 42 includes aft case flange 72A and forward case flange 72B for interconnecting TEC assembly 42 with other modules into engine 10 (shown in FIG. 1). Multi-purpose seal support 68 includes ring shaped body 74 with aft end 76 (shown in FIGS. 4A-4B) secured to a forward facing side of TEC assembly 42, and forward end 78 adjacent to and facing an aft side of upstream module 44 (FIG. 2). As was also shown in FIG. 2, seal assembly 66 can be mounted to a forward recessed portion of inner frame hub 56 (not visible in FIG. 3).

Figure 4A:
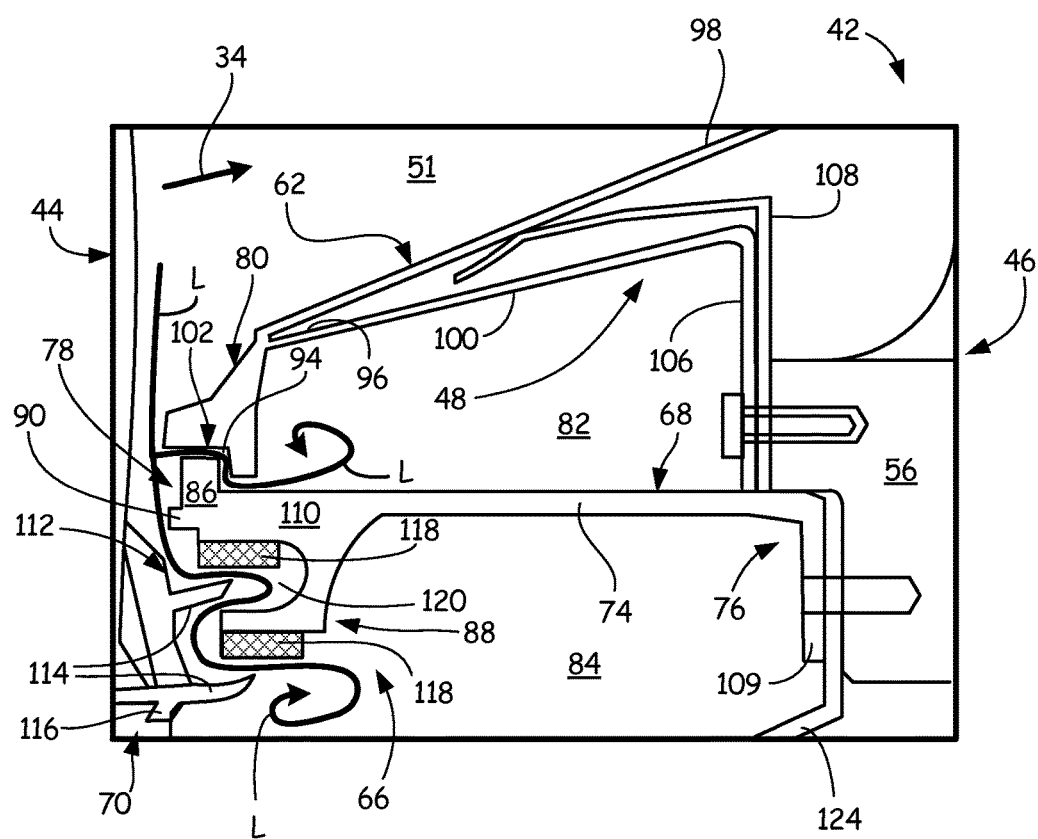
FIG. 4A shows the example seal assembly and multi-purpose seal support depicted in FIG. 2.
Figure 4B:
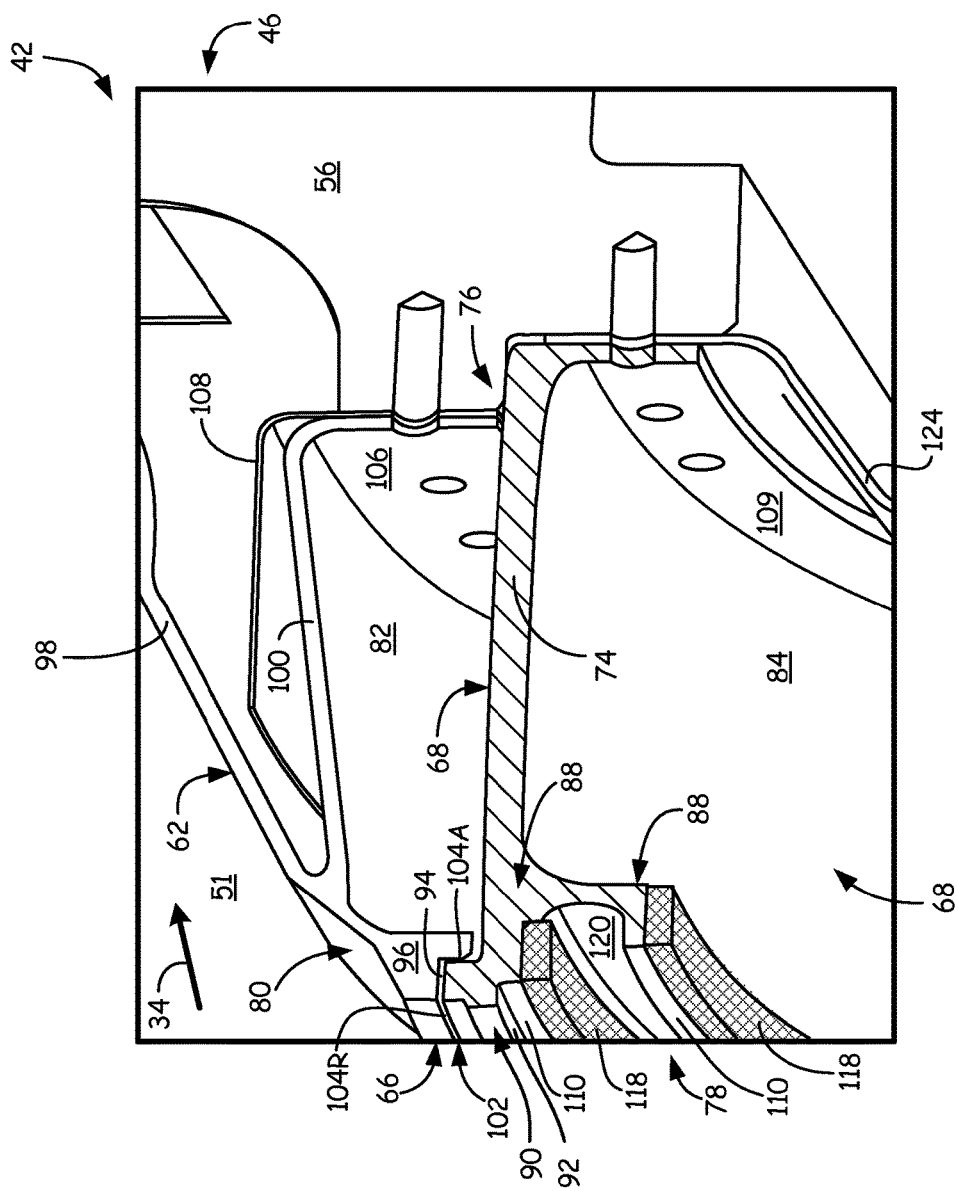
FIG. 4B is an isometric view of the region shown in FIG. 4A.

FIG. 4A depicts a detailed sectional view of the area in and around seal assembly 66. FIG. 4B is an isometric view of the area shown in FIG. 4A.

Assembly 66 interacts with forward end 80 of inner fairing platform 62 to minimize leakage from main engine gas flow passage 51. Multi-purpose seal support 68 is disposed between first cavity 82 and second cavity 84. During combustion, seal assembly 66 acts to limit a hot leakage gas flow L from entering first cavity 82 and second cavity 84, either of which would result in excessive heating of frame inner hub 56. Similarly, seal assembly 66 allows for purging of first cavity 82 prior to or during an engine warmup cycle. Assembly 66 can also limit secondary flow between first cavity 82 and second cavity 84. Additionally, assembly 66 limits damage to the engine in case an upstream rotor becomes damaged or loses functionality. Seal assembly 66 can provide all of these functions in a single piece which is more durable and cost effective than other solutions known in the art.

Multi-purpose seal support forward end 78 generally includes discourager portion 86, seal portions 88, and meshing portion 90. Discourager portion 86 can be a flow inhibiting flange or other structure adapted to engage with recess 94 formed in a surface of inner fairing platform 62. This has the effect of preventing ingestion into cavity 82. Here, recess 94 is machined out of fairing Y-junction 96, which connects fairing platform wall 98 and fairing wall 100. This allows for thermal growth and contraction of fairing assembly 48, with a thermal barrier between fairing platform wall 98 and frame inner hub 56. Discourager gap 102, which can include axial gap 104A and radial gap 104R, is defined between inner fairing platform 62 and seal support discourager portion 80. First (seal support) cavity 82 can be defined annularly by Y-junction 96, fairing mounting wall 100, fairing mounting flange 106, and seal support element body 74. Second (rotor) cavity 84 can be defined radially inward of multi-purpose seal support 68. Fairing mounting flange 106 can also serve as a backing ring for heat shield segment 108 which operates as a thermal radiation barrier for fairing mounting wall 100 and fairing mounting flange 106.

Fairing assembly 48 thermally expands and contracts based on engine operating conditions. Thus dimensions of discourager gap 102 range between a first low temperature state in which discourager portion 86 is spaced apart from Y-junction 96, and a second heated state in which discourager portion 86 closely engages or briefly contacts Y-junction 96 of inner fairing platform 62. When closely engaged, leakage flow L must pass through a tortuous path and change directions to reach cavity 82. Dimensions of gap 102 are enlarged because fairing assembly 48 shrinks or contracts toward frame 46. This allows for purging of first seal support cavity 96 when working gases 34 are at an engine idle or cold soak temperature. As the engine approaches full operating temperature, fairing assembly 48 thermally expands such that the dimensions of axial and/or radial gaps 104A, 104R are reduced, forming an effective discourager seal between inner fairing platform 62 and seal support discourager portion 86 to minimize leakage flow L into first cavity 82.

Figure 6:
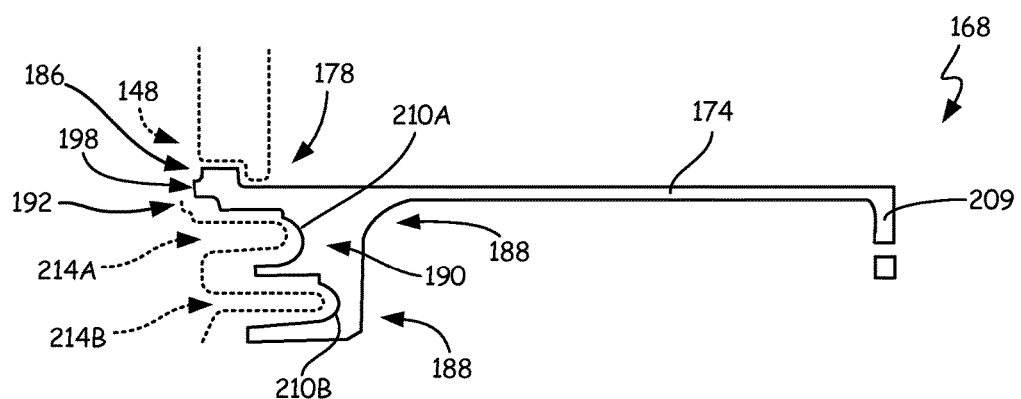
FIG. 6 is a sectional view of a second example embodiment of a multi-purpose seal support.

Seal portion 88 of multi-purpose seal support 68 includes at least one axially projecting seal land 110 disposed adjacent to a corresponding seal portion 112 on upstream module 44. Abradable seal pads 118 are secured to each seal land 110 to form a labyrinth seal between main gas flow passage 51 and second (rotor) cavity 84. In the illustrated example, two abradable seal pads 118 each receive knife edges 114, which can be formed on an aft side of upstream rotor disk 70 (e.g., mini-disk 116). A generally U-shaped recess 120 is also formed between adjacent seal lands 110. In alternative embodiments, seal land(s) 110 can be adapted to create an additional or alternative type of seal. For example, FIG. 6 shows a receiving portion of a fishmouth seal in place of the labyrinth seal lands shown in FIGS. 2-4B.

Seal assembly 68 also can include a meshing feature for use as a failsafe feature in the event of an upstream rotor failure. In this example, multi-purpose seal support 68 includes meshing portion 90 in which axial loads from a failure of rotor disk 70 can be transmitted into and through multi-purpose seal support 68. Here, example meshing portion 90 consists of projection 92 with a forward-most surface distal from TEC assembly 42 and facing rotor disk 70. In ordinary operation, projection 92 is spaced axially apart from the first module and from rotor disk 70 as shown. In the event that one or more portions of upstream module 44 (e.g., rotor disk 70) fails, rotor disk 70 will move aftward into, and contact meshing portion 90. This has the effect of bridging rotor disk 70 and TEC assembly 42 so that axial and rotational forces of rotor disk 70 are transmitted into seal support body 74. In turn, forces are absorbed by frame inner hub 56 by way of aft seal support flange 109. In certain embodiments, flow divider ring 124 can be secured between aft seal support flange 109 and frame inner hub 56. Flow divider ring 124 partially defines a boundary for a frame cooling air passage (not shown).

Figure 5A:
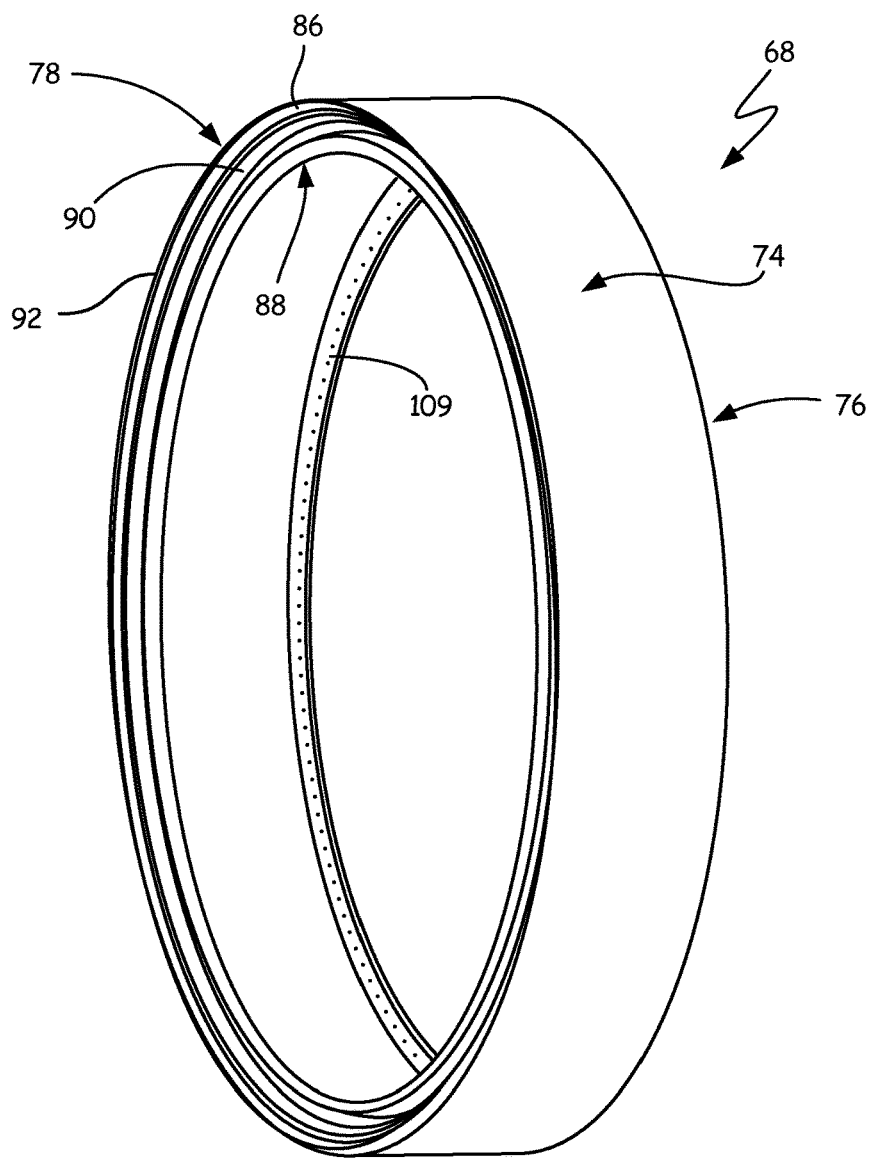
FIG. 5A isometrically shows a first example embodiment of a multi-purpose seal support element.
Figure 5B:
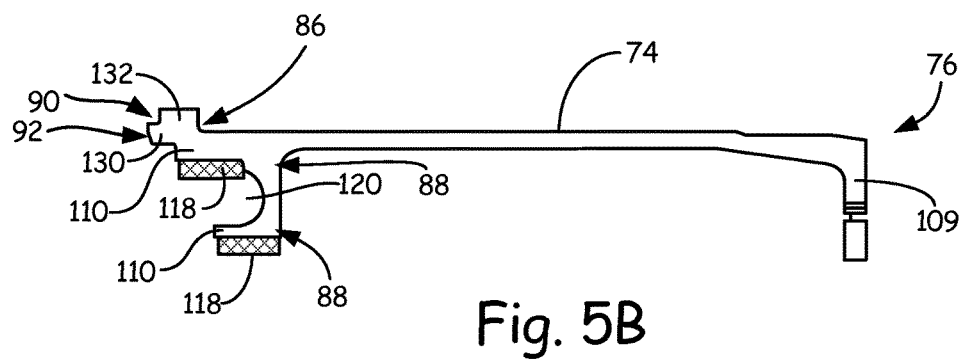
FIG. 5B is a sectional view of the seal support shown in FIG. 5A.

FIGS. 5A and 5B show multi-purpose seal support 68 independent of modules 42, 44. As was shown in FIGS. 4A-4B, multi-purpose seal support 68 includes ring-shaped body 74 extending axially between aft portion 76 and forward portion 78. Aft portion 76 includes aft seal support flange 109, which can be used to fasten multi-purpose seal support 68 to a turbine module (e.g., TEC assembly 42 shown in FIG. 2). Forward portion 78 includes three features integrated into one. Discourager portion 86 adapted to engage with a fairing assembly of a gas turbine engine. Discourager portion 86, for example, can comprise radial projection 130 and axial projection 132, or another shape adapted to engage with a corresponding portion of the fairing assembly. As shown in FIGS. 4A and 4B, a fairing assembly undergoes thermal growth and shrinkage depending on the operational state of the engine. Here, ring-shaped body 74 is sized so that axial projection 130 and radial projection 132 are disposed forward of the forward end of the fairing platform. This creates axial and radial discourager gaps 104A, 104R (shown in FIGS. 4A and 4B) so that an effective seal can formed with a fairing Y-junction to prevent leakage flow out of the main working gas flow passage and into a cavity disposed radially outward of multi-purpose seal support 68.

At least one seal land 110 is also incorporated into seal support forward end 78 for engaging a corresponding seal portion of an adjacent rotating gas turbine module. In the example of FIGS. 4A-4B, seal lands 110 may be adapted to receive knife edges formed on a rotor disk, or knife edges formed on a separate rotor attachment such as a mini-disk secured to an aft side of the main rotor disk. Each seal land 110 can have at least one abradable seal pad 118. Forward contact face on seal support body 74 can serve as a meshing portion 90 to contact a face of rotor disk 70 in the event of a rotor failure.

FIG. 6 shows a cross-section of an alternative multi-purpose seal support 168. Multi-purpose seal support 168 operates similarly to multi-purpose seal support 68 shown in FIGS. 2-5. Discourager portion 186 is adapted to define a gap between seal support forward end 178 and a corresponding portion of fairing assembly 148 (shown in phantom). Projection 192 forms a first meshing portion similar to meshing portion 90 shown above. However, seal lands 110 and abradable pads 118 (in FIGS. 2-5) have been replaced with fish mouth recesses 210. Fish mouth recesses 210A, 210B each receive respective legs 214A, 214B (also shown in phantom) projecting from an upstream module (e.g., upstream rotor disk or mini-disk). In this example, in addition to fish mouth recess 210A and optional recess 210B operating as a sealing portion 188, there can be a second meshing portion 190. In the event of failure of the upstream module, one or both legs 214A, 214B would contact the surfaces of respective recesses 210A, 210B to transfer additional meshing loads through body 174 to aft support flange 209.

Multi-purpose seal support 68 and 168 allow three important functions of a gas turbine engine to be incorporated into a relatively small space. The meshing feature can be incorporated adjacent to the sealing portion so that a knife edge, fishmouth leg or other seal projection on the rotor can create a failsafe bridging relationship proximate the seal lands. The forward end of the seal support is also in close proximity to fairings defining the main gas flow passage. Thus a discourager such as a flow inhibiting flange or other projection can be located proximate the sealing and meshing portions.

In addition, multi-purpose seal supports 68,168 are also easily manufacturable and replaceable. They can be mounted directly to a completed gas turbine module (e.g., a turbine exhaust case), simplifying assembly and maintenance of the engine. For example, if one of the features fails or reaches the end of its useful life, a new multi-purpose seal support can be quickly removed and replaced during any maintenance activity requiring separation of the two adjacent modules.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
    a first module comprising a turbine exhaust case module for a gas turbine engine; the turbine exhaust case module comprising a fairing assembly secured over annular surfaces of a frame, defining a first portion of a main gas flow passage annularly between an inner fairing platform and an outer fairing platform, and around a plurality of frame strut liners;
    a second module connected immediately upstream of the first module, the second module comprising a low pressure turbine rotor module rotatable about a center line of the gas turbine engine, the low pressure turbine rotor module including a plurality of rotor blades extending radially through a second portion of the main gas flow passage and fluidly coupled with the first module and the first portion of the main gas flow passage; and
    a multi-purpose seal support secured proximate to the main gas flow passage between the first and second modules, the seal support comprising:
    a ring-shaped body;
    an aft end flange securing the seal support to an inner hub of the first module frame; and
    a forward end disposed extending forward from the ring-shaped body toward the second module, the forward end having a discourager portion, a seal portion, and a meshing portion, wherein:
    the discourager portion includes at least one flange extending at least axially forward from the ring-shaped body toward a complementary recess formed in an aft end of the second module such that the at least one flange forms at least one discourager gap with the recess, the discourager gap providing a tortuous leakage path for leakage flow from the main gas flow passage,
    the seal portion includes at least one axially projecting seal land extending toward a cooperating seal portion on the second module, and
    the meshing portion includes a projection extending forward from the ring-shaped body toward an aft face of a rotor disk on the second module, the projection having a forwardmost surface spaced adjacent to the rotor disk such that failure of the second module causes the rotor disk to contact the forwardmost surface and transmit forces from the rotor disk through the ring-shaped body into the inner hub.

2. The assembly of claim 1, wherein the complementary recess is formed in an inner fairing platform.

3. The assembly of claim 2, wherein the at least one flange of the discourager portion is spaced apart from the recess such that at least one of axial and radial dimensions of the discourager gap in a first idle or cold soak temperature state is larger than the at least one dimension in a second operating temperature state to form the tortuous leakage path between the fairing and the seal support at the second operating temperature.

4. The assembly of claim 1, wherein the at least one seal land includes at least one labyrinth seal land disposed axially adjacent to a corresponding knife edge of the second module.

5. The assembly of claim 1, wherein the at least one seal land includes at least one fishmouth seal recess receiving a corresponding leg of the second module.

6. The assembly of claim 1, further comprising a U-shaped recess formed between two adjacent seal lands of the first module.

7. The assembly of claim 1, wherein a downstream end of the turbine exhaust case is fluidly coupled with a power turbine assembly.

8. The assembly of claim 1, wherein the at least one flange of the discourager portion has both an axial discourager projection and a radial discourager projection.

9. A turbine exhaust case (TEC) assembly comprising:
    a frame including an outer case, an inner hub, and a circumferentially distributed plurality of struts extending radially between the outer case and the inner hub;
    a fairing assembly secured over annular surfaces of the outer case, the inner hub, and the plurality of struts, defining a first portion of a main gas flow passage annularly through the frame between the outer case and the inner hub and around the plurality of struts; and
    a multi-purpose seal support comprising:
    a ring-shaped body;
    an aft end flange securing the seal support to a forward surface of the inner hub, and
    a forward end extending forward from the ring-shaped body, the forward end having a discourager portion, a seal portion, and a meshing portion, wherein:
    the discourager portion includes at least one flange extending at least axially forward from the ring-shaped body and configured to engage a complementary recess in an aft end of a low pressure turbine rotor module, forming at least one discourager gap with the complementary recess, the discourager gap providing a tortuous leakage path for leakage flow from the main gas flow passage;
    the seal portion includes at least one axially projecting seal land and is configured to engage a cooperating labyrinth or fishmouth seal portion on the low pressure turbine rotor module, and
    the meshing portion includes a projection extending axially forward from the ring-shaped body, the projection having a forwardmost surface adjacent to the rotor disk, such that the forwardmost surface is spaced from the rotor disk until failure of the second module, upon which the rotor disk contacts the forwardmost surface and transmits forces from the rotor disk through the ring-shaped body into the frame inner hub.

10. The TEC assembly of claim 9, wherein the at least one flange of the discourager portion is shaped to form the discourager seal in cooperation with a recess formed into a Y-junction disposed on a forward side of the fairing assembly proximate the inner hub.

11. The TEC assembly of claim 10, wherein the at least one flange of the discourager portion is spaced apart from the recess such that at least one of axial and radial dimensions of the discourager gap range between a first low temperature state in which the discourager portion is spaced apart from the fairing, and a second high temperature state in which the discourager portion forms the discourager seal with the fairing.

12. The TEC assembly of claim 9, wherein the at least one seal land comprises an abradable pad.

13. The TEC assembly of claim 9, wherein the at least one seal land is a recess adapted to receive a corresponding leg for a fishmouth seal.

14. The TEC assembly of claim 9, wherein the forwardmost surface is distal from the remainder of the seal support and the TEC assembly.

15. The assembly of claim 9, wherein the at least one flange of the discourager portion has both an axial discourager projection and a radial discourager projection.

16. A multi-purpose seal support for a gas turbine engine, the assembly comprising:
   a ring-shaped body including a axially forward end and an axially aft end;
   an aft support flange at the axially aft end of the body, the aft support flange adapted to secure the seal body to an inner frame hub of a turbine exhaust case frame;
   a flow inhibitor formed at the forward end of the body, extending at least axially forward from the ring-shaped body, the flow inhibitor including at least one flange adapted to engage a complementary recess in an aft end of a low pressure turbine rotor module, the at least one flange forming at least one discourager gap with the complementary recess, the discourager gap providing a tortuous leakage path for leakage flow from a main gas flow passage extending through the turbine exhaust case frame;
   a seal portion including at least one axially projecting seal land formed proximate the flow inhibitor, the at least one axially projecting seal land adapted to engage a cooperating seal portion on a low pressure turbine rotor module; and
   a bridge portion disposed proximate the seal, the bridge portion including a projection extending axially forward from the ring-shaped body, the projection having a forwardmost surface adjacent to a rotor disk of the low pressure turbine rotor module, such that the forwardmost surface is spaced from the rotor disk until failure of the low pressure turbine rotor module, upon which the rotor disk contacts the forwardmost surface and transmits forces from the rotor disk through the ring-shaped body into the inner frame hub.

17. The multi-purpose seal support element of claim 16, wherein the at least one flange of the flow inhibitor has both an axial discourager projection and a radial discourager projection.

18. The multi-purpose seal support element of claim 16, wherein the at least one seal land comprises an abradable seal pad for a labyrinth seal.

19. The multi-purpose seal support element of claim 16, wherein the at least one seal land comprises a recess adapted to receive a corresponding leg for a fishmouth seal.

* * * * *